UNITED STATES PATENT OFFICE

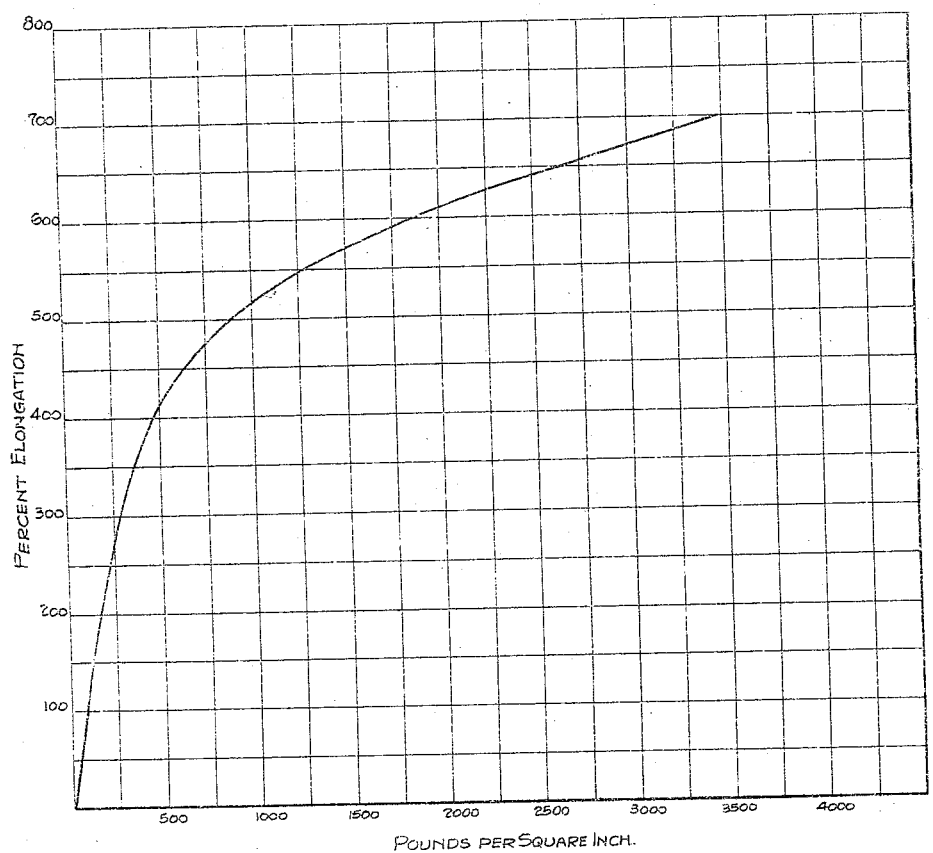

RALPH V. HEUSER, OF ELIZABETH, NEW JERSEY, ASSIGNOR TO AMERICAN CYANAMID COMPANY, OF NEW YORK, N. Y., A CORPORATION OF MAINE

RUBBER ACCELERATOR

Application filed November 23, 1926. Serial No. 150,265.

This invention relates to rubber accelerators, more particularly to a composition adapted to rapidly and effectively cause the vulcanization of rubber mixtures.

It has been well known for some time that substituted guanidines, notably disubstituted guanidines, such as diphenylguanidine, diorthotolylguanidine and dixylylguanidine are excellent accelerators of the vulcanization of rubber when used in very small quantities.

I have discovered that if the usual aromatic groupings in substituted guanidines are replaced by alkyl groups containing aromatic nuclei, or in other words if there is introduced into the compound, an alkene group which is the linkage between a phenyl group and a nitrogen, a much stronger accelerator is obtained. For instance, if a $CH_2$ group is introduced into each of the substituted nitrogens of diphenyl-guanidine so that the benzene rings are linked by said groups to the nitrogen, an accelerator is obtained which is far superior to diphenyl-guanidine for the vulcanization of rubber. In a similar manner, other groups of the same character may be introduced into the compound, resulting in far better accelerators than would be the case had the substitution not been made.

Typical of the class of compounds constituting the subject matter of this invention is dibenzylguanidine which has been found to be an excellent accelerator. This substance may be readily made in various ways, but preferably I cause a reaction to take place between benzylamine and cyanogen chloride similar to the reactions described in my copending application for method of making diphenylguanidine, Serial No. 1,393, filed January 9, 1925, and application for method of making substituted guanidines, Serial No. 13,208, filed March 5, 1925. To accomplish this, I may take 25 kilograms of benzylamine and about 50 kilograms of chlorbenzol as a solvent, and introduce into the same an excess of cyanogen chloride in the gaseous state. After absorption of the cyanogen chloride has ceased, I heat the mixture with a reflux condenser at a temperature of about 130° C. for about one hour to complete the reaction. I then add water to the reaction product and distil the same with steam to remove the chlorbenzol. The residue of distillation containing some gummy impurities is treated with a weak solution of sodium carbonate for the purpose of purification, resulting in a precipitate which is filtered off. Dibenzylguanidine is then precipitated from the filtered solution with a solution of sodium hydroxide, washed and dried. It has the following formula:

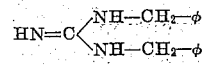

where ø indicates a benzene ring.

A rubber batch of the following standard formula was compounded with the dibenzylguanidine accelerator, the ingredients being added in the order mentioned:

|  | Gm. |
|---|---|
| Pale crepe | 475 |
| Zinc oxide master batch 50% ZnO | 50 |
| Accelerating material weighed to 0.01 gm. | 5 |
| Sulphur | 25 |

A number of sheets of this mixture were vulcanized in a hydraulic press under steam pressure at 288° F. for thirty minutes and the vulcanizates were then allowed to stand for at least sixteen hours before testing.

In the accompanying drawing constituting a part hereof, the single figure is a curve showing the relation between the stress applied to the test pieces and the elongation thereof up to the breaking point of the above mixture, containing dibenzylguanidine as an accelerator.

It will be seen from the curve that at 600% elongation the stress is approximately 1875 lbs. per square inch, which compares very favorably with similar test pieces made with diphenylguanidine as the accelerator, and tested under exactly the same conditions, wherein at 600% elongation the stress was 1350 lbs. per square inch. The tension at break of the test pieces made with dibenzylguanidine was about 3800 lbs. per square inch at an elongation of 710% as compared to a tension at break for the material made with diphenylguandine of 3650 lbs. per square inch at an elongation of 755%. The new accelerator is therefore shown to be markedly superior to dipenylguanidine which has been used to a very large extent in the vulcanization of rubber.

It is apparent that although I have described my invention with specific reference to the preparation and use of dibenzylguanidine as an accelerator, many other compounds of similar constitution may be made in accordance with the present invention. For instance, I may make similar guanidines of the general formula

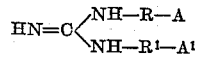

where R and R¹ are the same or different alkene groups, and A and A¹ are the same or different aromatic groups. My invention is also applicable to the preparation of substituted guanidines of the following general formulæ:

Tri-substituted guanidines as well as mono and di-substituted guanidines are contemplated by my invention. In the description of the specific embodiment of my invention I have indicated the presence of a methylene or methene group as the link between nitrogen and the aromatic nucleus but it is obvious that other alkene groups, such as ethene, propene, etc., may be substituted therefor, and in similar manner other aromatic groups may be substituted for the phenyl group. The alkene groups, as is well known, correspond with the following general formula:
.

My invention is not limited to the method for making the substances described above, as various other methods may be used for producing the same, but I prefer to use this method because of its simplicity and of the purity of the products obtained.

What I claim is:

A vulcanizable rubber composition containing as a vulcanization accelerator a dibenzylguanidine having the following formula:

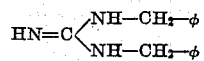

where φ indicates a benzene ring.

In testimony whereof, I have hereunto subscribed my name this 19th day of November, 1926.

RALPH V. HEUSER.